(12) United States Patent
Chen (10) Patent No.: US 6,671,175 B1
(45) Date of Patent: Dec. 30, 2003

(54) ASSEMBLY OF COMPUTER PERIPHERALS

(76) Inventor: Jung I Chen, No. 7, Lane 33, Yung An St, Yungho City, Taipei Hsien (TW)

( * ) Notice: Subject to any disclaimer, the term of this patent is extended or adjusted under 35 U.S.C. 154(b) by 0 days.

(21) Appl. No.: 10/320,704

(22) Filed: Dec. 17, 2002

(30) Foreign Application Priority Data

Oct. 9, 2002 (TW) ...................................... 91216081 U (51) Int. Cl.[7] .............................................. H05K 7/20
(52) U.S. Cl. ...................... 361/715; 361/687; 361/688; 361/676; 165/245; 165/259; 165/244
(58) Field of Search ................................ 361/715, 692, 361/676, 681, 687, 688, 695, 702, 703, 709, 752, 714, 796; 257/99; 165/236, 244, 245, 253, 259, 298

(56) References Cited

U.S. PATENT DOCUMENTS 5,592,989 A * 1/1997 Lynn et al. .................. 165/259
5,963,424 A * 10/1999 Hileman et al. ............ 361/695
6,058,009 A * 5/2000 Hood et al. .................. 361/687
6,396,675 B1 * 5/2002 Su .............................. 361/103

* cited by examiner

*Primary Examiner*—David Martin
*Assistant Examiner*—Hung Bui
(74) *Attorney, Agent, or Firm*—Browdy and Neimark, P.L.L.C.

(57) ABSTRACT

An assembly of computer peripherals, which has the functions of (temperature control and fan rotation speed regulation, includes a host casing, a temperature sensing circuit, a fan driver circuit, a liquid crystal display (LCD) driver circuit, an alarm circuit, a fan rotation regulating device for regulating the fan rotation speed within a safe range, a control device for selectively showing the location of the host casing, the hard disk and the microprocessor on the LCD, and a control circuit, all of which are connected to one another. The user controls the fan rotation speed regulating device according to the fan rotation speed value shown on the LCD to optimize the rotation speed of the fan used for the microprocessor and then minimize the noise. Furthermore, the location of the heat source to be sensed can be changed.

9 Claims, 7 Drawing Sheets

ASSEMBLY OF COMPUTER PERIPHERALS

BACKGROUND OF THE INVENTION

1. Field of the Invention

The invention relates to an assembly of computer peripherals. More specifically, the invention relates to an assembly of computer peripherals, in which a personal computer can be controlled under a safe condition.

2. Description of the Related Art

In a current computer, most of the heat is generated from the microprocessor, the hard disk or the host casing. Therefore, effectively dissipating heat of the computer is an important issue to prevent a dysfunction.

TW Patent publication No. 377037 discloses a known temperature control is device that senses the operating temperature. The temperature, control device includes a dismountable host casing, a temperature controlling IC board, a fan, and a panel. The temperature controlling IC board is a circuit board screwed onto a rear side of the panel and provided with a temperature probe. A square liquid crystal display (LCD) screen is mounted on the temperature control device. A plurality of indicator lighting elements are mounted at a left side of the LCD screen. A bolt hole is formed at each corner of the panel. The temperature probe is mounted on the hard disk to sense the temperature during operation of the hard disk. The temperature control device only has the function of sensing the temperature of the hard disk in operation.

TW Patent Publication No. 315005 discloses a sensing device that has the functions of temperature sensing and fan rotation speed sensing. The sensing device includes a host casing, two temperature sensors, a fan speed sensing device and a buzzer. A panel is mounted on a front surface of the host casing. A temperature indicating screen, four temperature indicating light emitting diodes (LEDs), four indicating LEDs showing the fan configuration, and a beeper are further respectively mounted on the panel.

The sensing device is mounted inside a 3.5"disk cartridge in the host casing. The temperature indicating LEDs respectively emit different lights according the temperature sensed by the temperature sensor. The rotation of the, fan is evaluated from the indicating LEDs and the sounds emitted from the buzzer.

However, the user does not know the fan rotation speed from the readings of the display screen, neither can properly regulate the, fan rotation speed to reduce parasitic noises. In other words, a personal computer can not be controlled under a safe condition.

SUMMARY OF THE INVENTION

It is therefore a principal object of the invention to provide an assembly of computer peripherals, in which a personal computer is controlled under a safe condition.

In one aspect of the invention, there is provided an assembly of computer peripherals, by which a user can control the fan rotation speed regulating device according to the fan rotation speed value shown on the LCD to optimize the rotation speed of the fan used for the microprocessor and then to minimize the noise. Since 70% of parasitic noises of the host come from the fan used for the microprocessor, the user can regulate the fan rotation speed to a proper value to render the working environment more comfortable.

In another aspect of the invention, there is provided an assembly of computer peripherals, by which the rotation speeds of fans used for different CPUs are regulated within safe ranges.

In still another aspect of the invention, there is provided an assembly of computer peripherals that selectively shows the location of a casing, a hard disk and a microprocessor on a LCD.

In still another aspect of the invention, an alarm device that, can sense a microprocessor temperature and a fan rotation speed is provided. When the fan rotation speed is lower than 1000–1500 rpm or the microprocessor temperature is higher than 65° C., a buzzer of the alarm circuit timely emits a sound to warn the user to control the operations of the fan and the microprocessor under a safe condition.

To accomplish the above and other objectives, an assembly of computer peripherals, which has the functions of temperature control and fan rotation speed regulation, is provided. The assembly of computer peripherals includes:

- a temperature sensing circuit, for sensing a temperature increases due to the heat from a host casing, a hard disk and a microprocessor in operation;
- a fan driver circuit, for driving the fan to rotate;
- a liquid crystal display (LCD) driver circuit, connected to a LCD to respectively indicate the location of a heat source, a sensed temperature value and a fan rotation speed;
- a fan rotation regulating device, for regulating the fan rotation speed within a safe range;
- a control device, for selectively showing the location of the host casing, the hard disk and the microprocessor on the LCD; and
- a control circuit, respectively connected to the control device, the fan rotation speed regulating device, the temperature sensing circuit, the fan driver circuit and the LCD driver circuit, wherein the control circuit drives the LCD and the fan, and the fan rotation-speed regulating device is controlled according-to-the fan rotation speed value shown on the LCD in order to keep the fan safely rotating while avoiding an excessively high temperature.

To provide a further understanding of the invention, the following detailed description illustrates embodiments and examples of the invention that are provided for explaining the invention and should not be construed to limit the scope of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Wherever possible in the following description, like reference numerals will refer to like elements and parts unless otherwise illustrated.

With reference to FIG. 1 through FIG. 5, an assembly of computer peripherals, which has the functions of temperature control and fan rotation speed regulation, includes a host casing 1, a temperature sensing circuit 2, a fan driver circuit 3, a liquid crystal display (LCD) driver circuit 4, an alarm circuit 5, a fan rotation speed regulating device 6, a control device 7, a control circuit 8, and a connection port 9.

Figure 1:
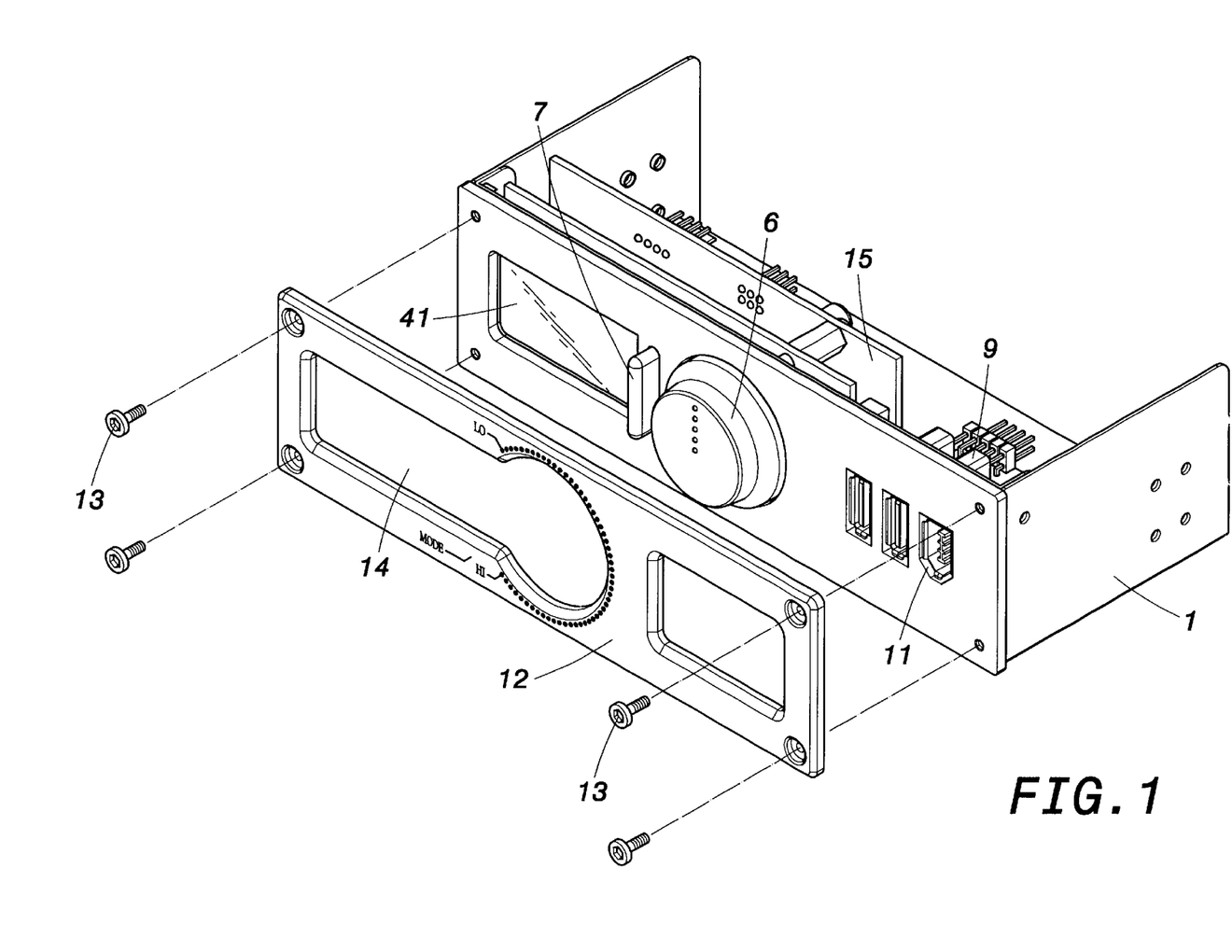
FIG. 1 is an exploded view of an assembly of computer peripherals according to one embodiment of the invention.
Figure 2:
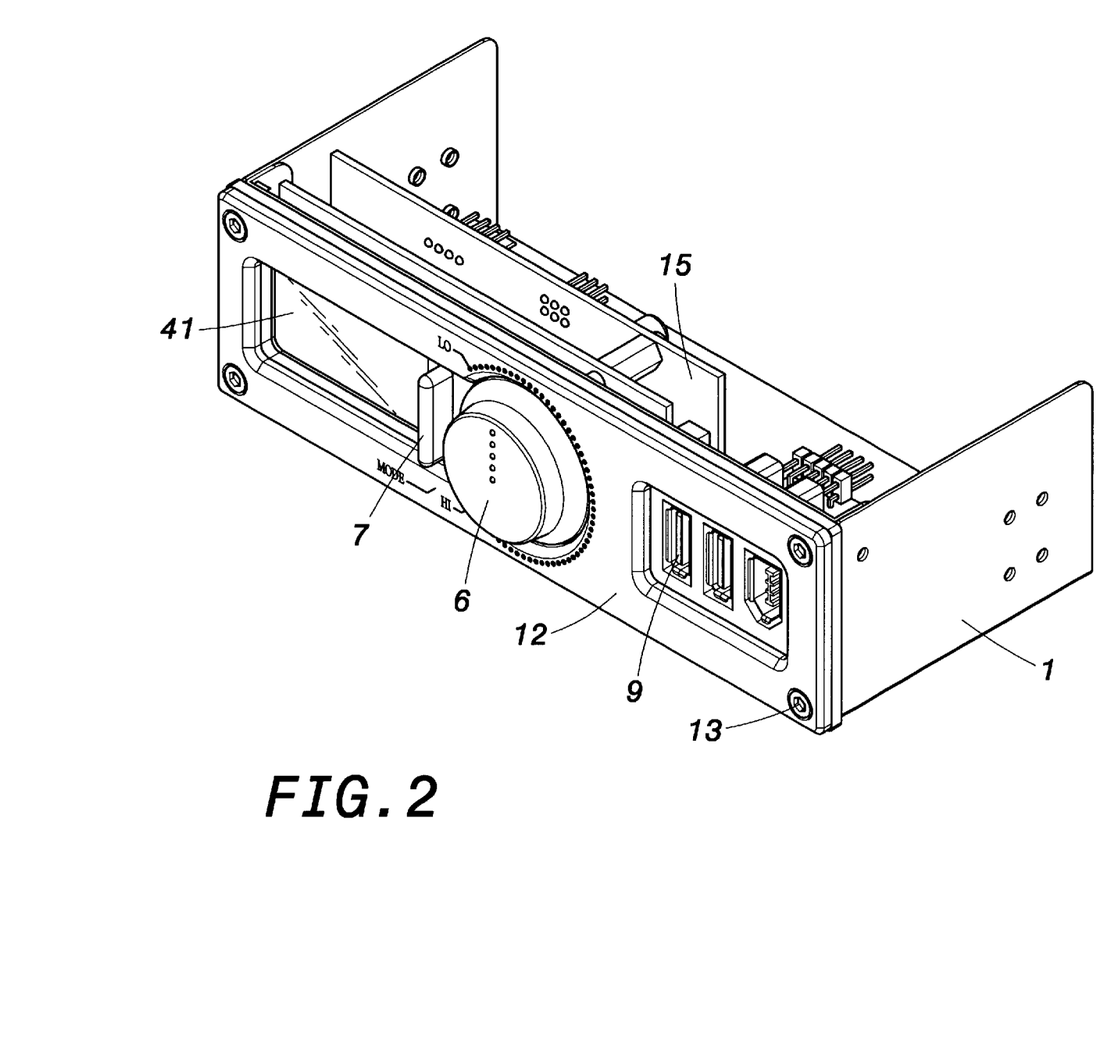
FIG. 2 is a perspective view of an assembly of computer peripherals according to one embodiment of the invention.
Figure 3:
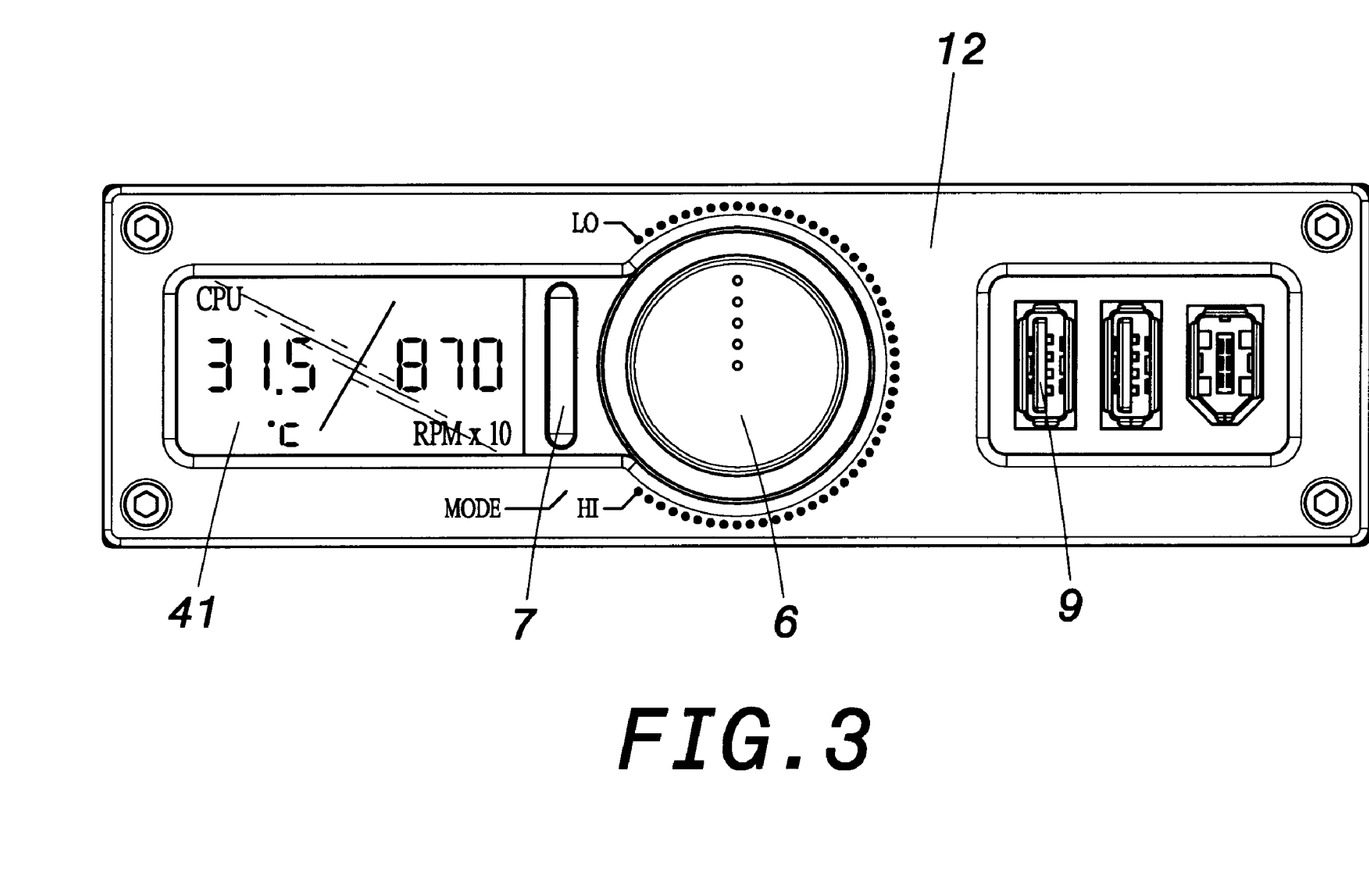
FIG. 3 is a front view of an assembly of computer peripherals according to one embodiment of the invention.
Figure 4:
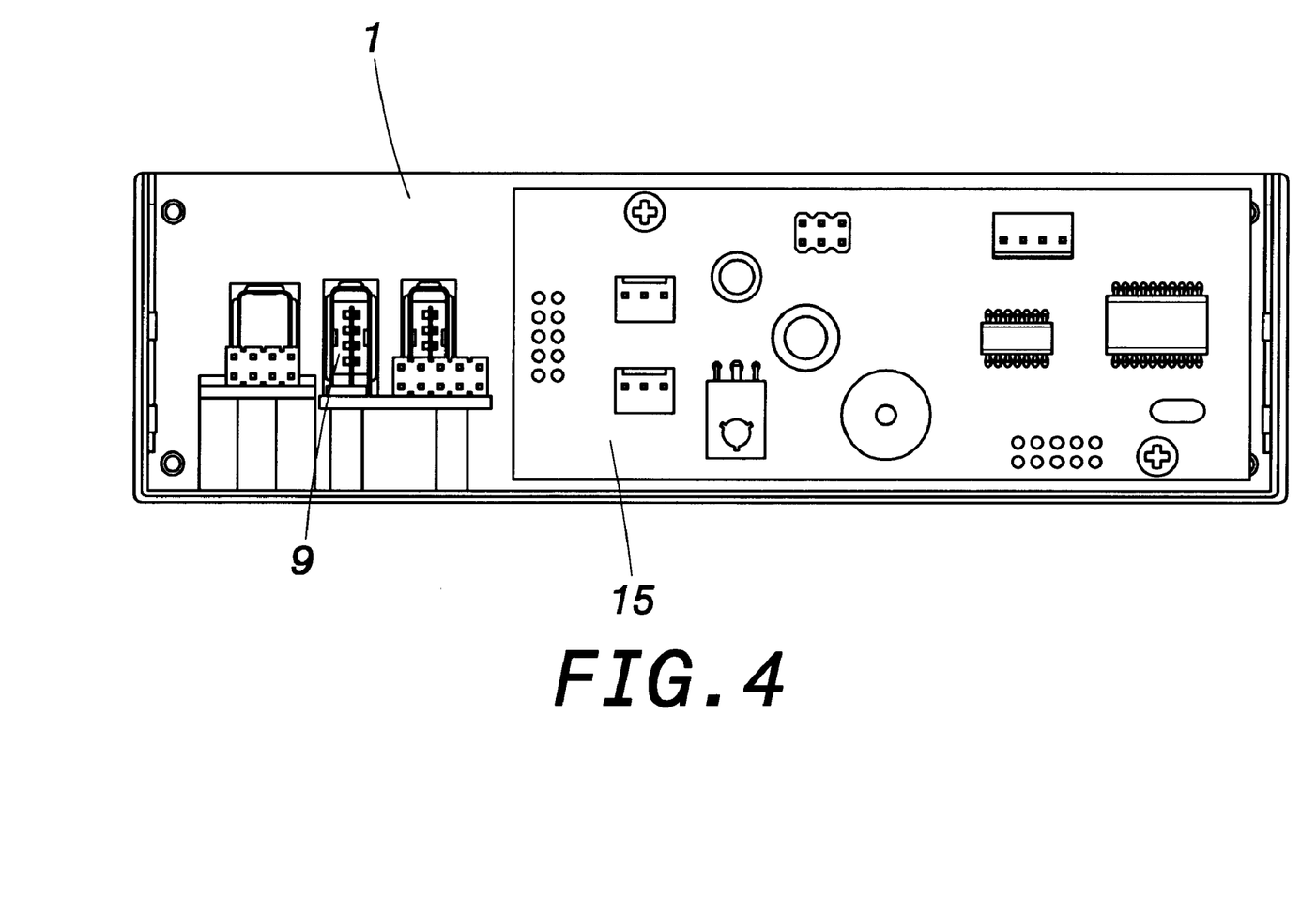
FIG. 4 is a rear view of an assembly of computer peripherals according to one embodiment of the invention.
Figure 5:
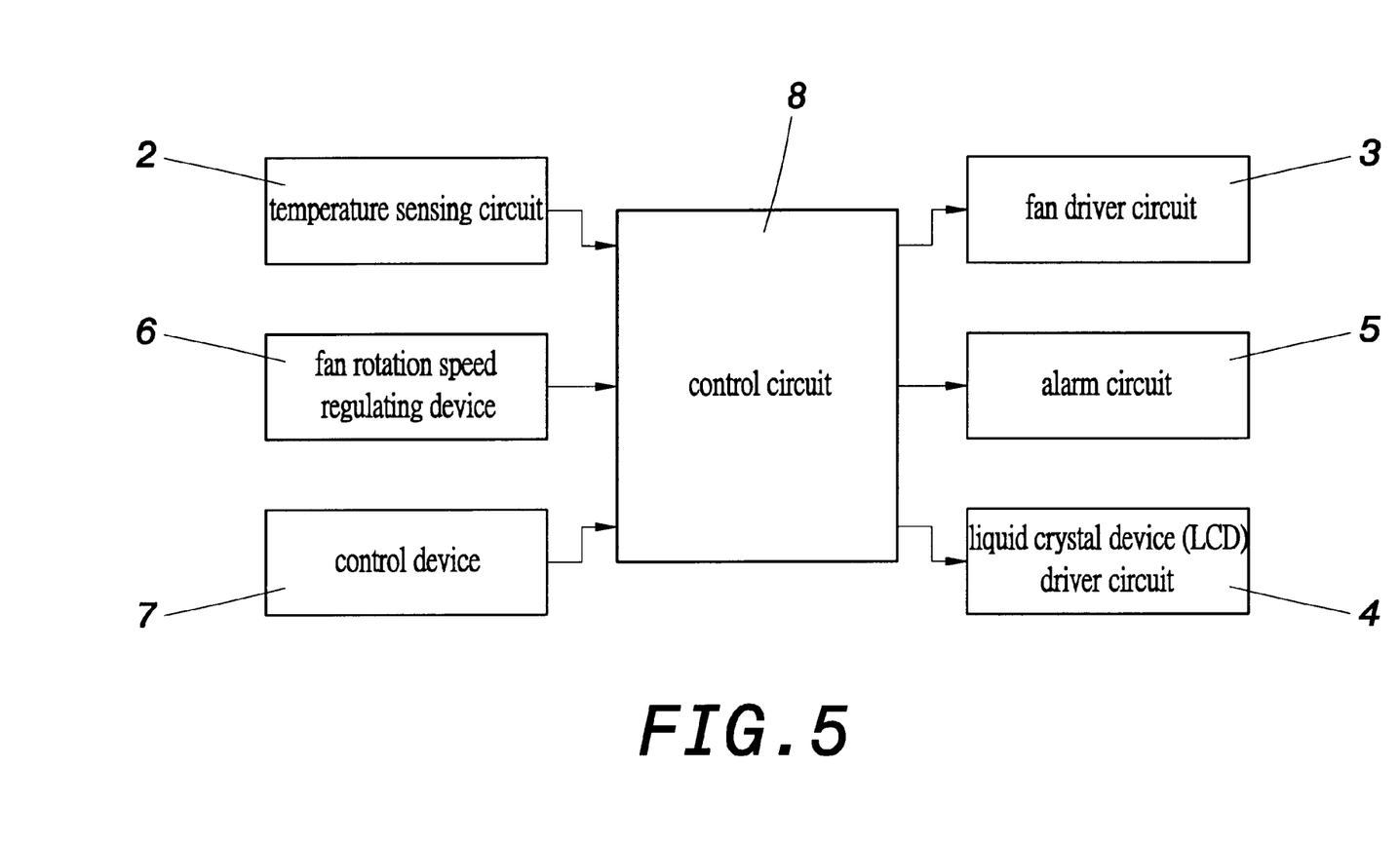
FIG. 5 is a block diagram of an assembly of computer peripherals according to one embodiment of the invention.

The host casing 1 has an approximately parallelepiped shape. A plurality of slots 11 are formed on a right side of the front surface of the host casing 1. A circuit board 15 is arranged inside the host casing 1. An aesthetic panel 12 is mounted on the front surface of the host casing 1. The panel 12 is replaceable and; is fixed to-the-host-casing 1 through, for example, a plurality of engaging elements 13. A hollow portion 14 is formed on the panel 12.

With reference to FIG. 2, and FIG. 5 through FIG. 7, the temperature sensing circuit 2 is mounted on the circuit board 15. The temperature sensing circuit 2 includes a plurality of sensing elements RT1, RT2, RT3, a plurality of capacitors CT1, CT2, CT3, and a connector JP8, which are connected to one another. The sensing elements RT1, RT2, RT3 are, for example, thermal sensitive resistors. The sensing elements RT1, RT2, RT3 are respectively mounted on the host casing, a hard disk, and a microprocessor (not shown) to sense the temperature increases due to the heat from the host casing 1, the hard disk and the microprocessor in operation.

Figure 6:
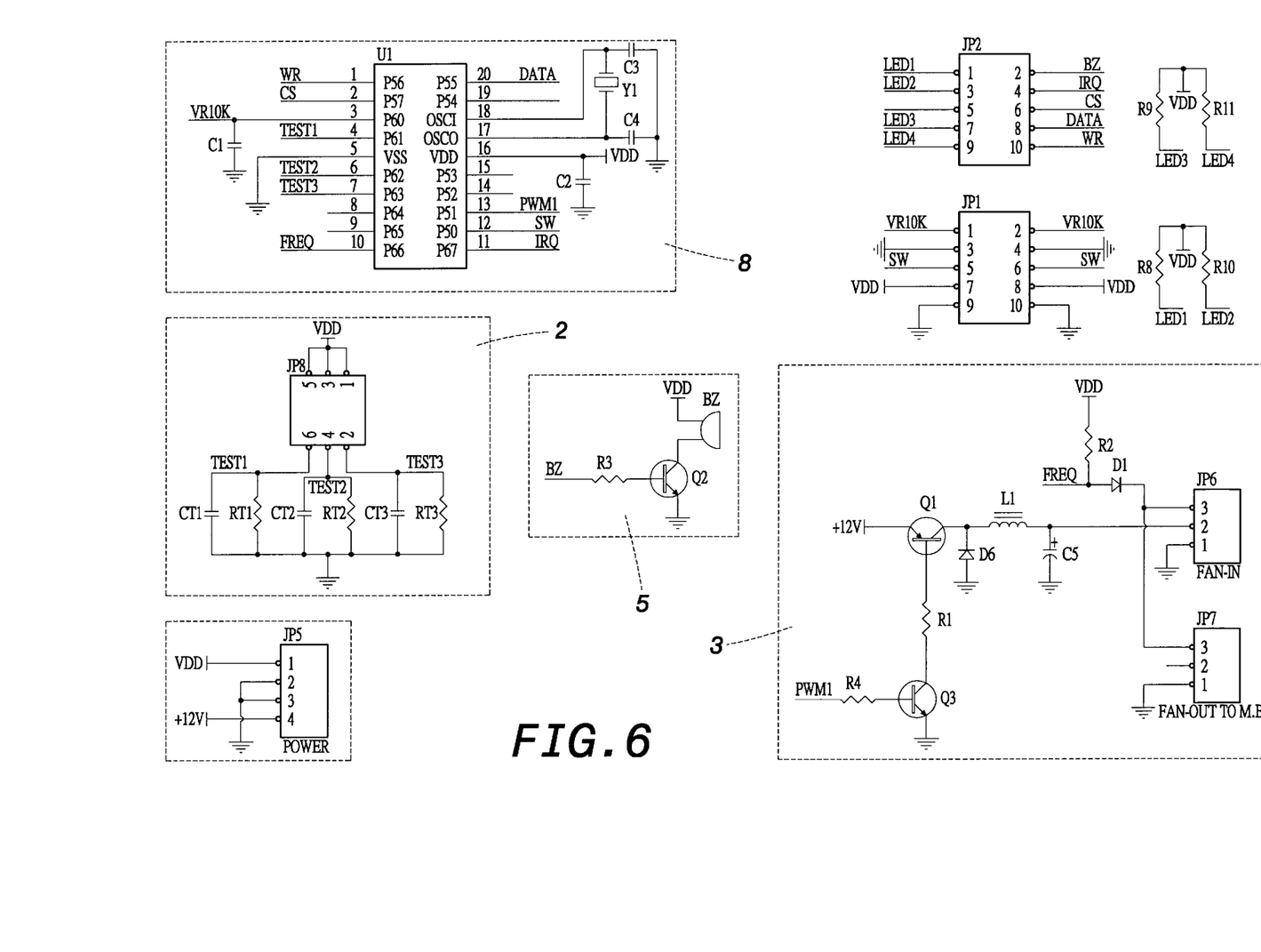
FIG. 6 is a circuit layout of an assembly of computer peripherals including a temperature sensing circuit, a fan driver circuit, an alarming circuit and a control circuit according to one embodiment of the invention.

The fan driver circuit 3 is mounted on the circuit board 15, and includes transistors Q1, Q3, light emitting diodes (LED) D1, D6, resistors R1, R2, R4, a capacitor C5, a coil L1 and connectors JP6, JP7, all of which are connected to one another to drive the fan.

Figure 7:
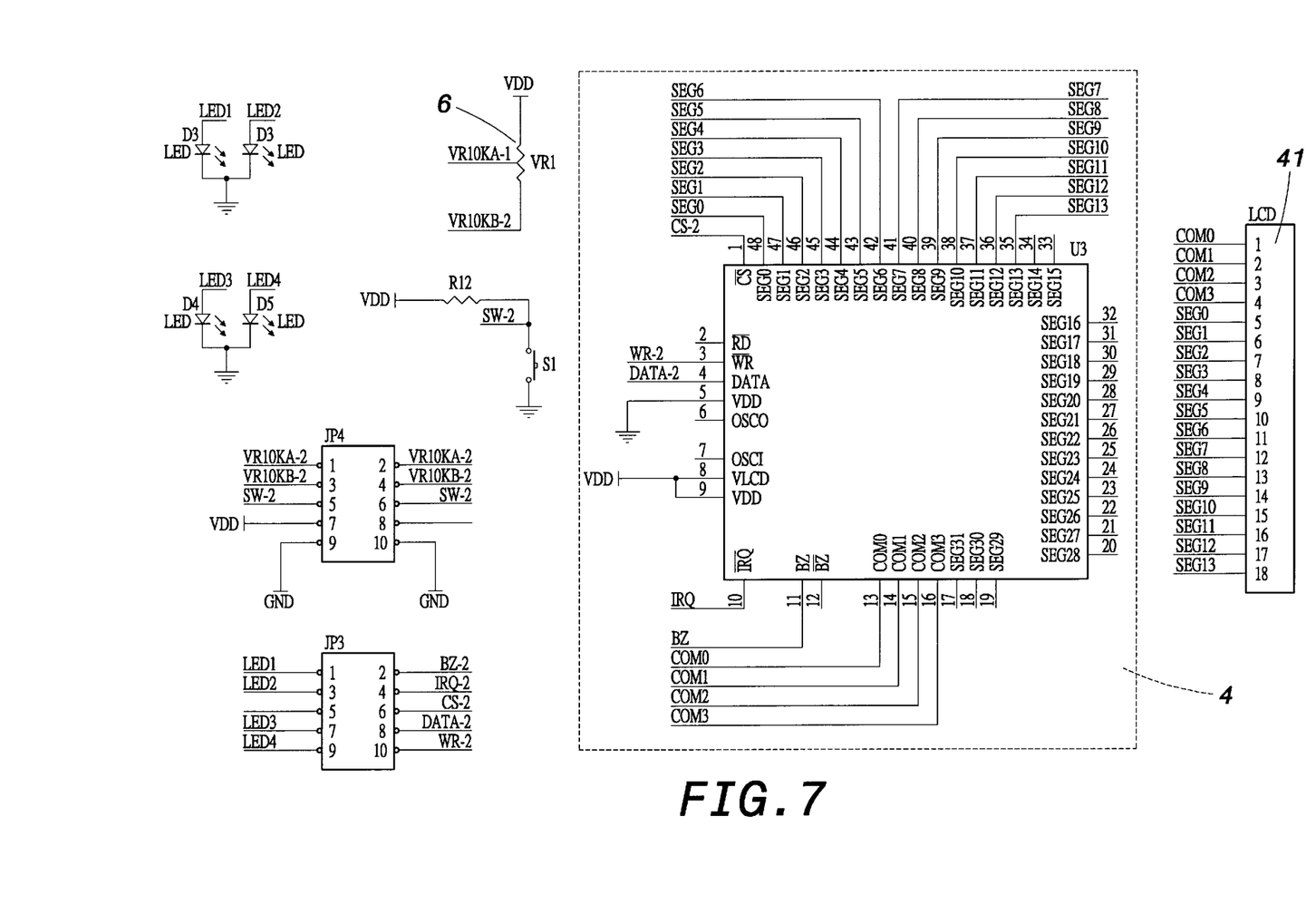
FIG. 7 is a circuit layout of a liquid crystal display (LCD) driver circuit and a fan rotation speed regulating device in an assembly of computer peripherals according to one embodiment of the invention.

The LCD driver circuit 4 is mounted on the circuit board 15. The LCD driver circuit 4, includes a driver IC U3 and is connected to the LCD display 41. The LCD display 41 is mounted on the front surface of the host casing 1 to respectively indicate the location of heat source, the sensed temperature value, and the fan rotation speed.

The alarm circuit 5 is mounted on the circuit board 15 and includes a transistor Q2, a resistor R3, and a buzzer Bz, all of which are connected to one another. The alarm circuit 5 has the buzzer Bz sound when the temperature of the heat source is excessively high or the fan rotation speed is lower than a predetermined value.

In the embodiment of the invention, when the fan rotation speed is lower than 1000–1500 rpm or the heat dissipating performance is not enough, or when the temperature of the microprocessor is higher than 65° C., the buzzer Bz of the alarm circuit 5 warns the user to regulate the fan rotation speed. Thereby, the microprocessor can be operated under a safe condition.

The fan rotation speed regulating device 6 is mounted on the front surface of the host casing 1 to regulate the fan rotation speed within a reasonable range to reduce noises generated during rotation of the fan. 70% of noises of the host comes from the fan for the microprocessor. If the user is disturbed by the fan noise, he/she can regulate the fan rotation speed to a proper value, thereby rendering the working environment more comfortable.

The control device 7 is mounted on the front surface to selectively show the location of the host casing 1, the hard disk and the microprocessor on the LCD 41.

The control circuit 8 is respectively connected to the control device 7, the fan rotation speed regulating device 6, the temperature sensing circuit 2, the fan driver circuit 3 and the LCD driver circuit 4. The control circuit 8 includes a control IC U1, a quartz crystal Y1, and capacitors C1–C4, all of which are connected to one another.

According to either the use configuration of the control device 7 and the fan rotation speed regulating device 6 or the temperature sensed by the temperature sensing circuit 2, the control circuit 8 respectively drives the LCD 41, the fan, and the alarm circuit 5 in a manner that the fan safely keeps rotating while avoiding excessively high temperature. Meanwhile, it is easy for the user to evaluate the operation and temperature conditions of the fan.

The connection port 9 is mounted on a right side of the front surface of the host casing 1, and includes universal serial buses (USBs) and an IEEE1394 port.

Thereby, the personal computer can be controlled under a safe condition.

In view of the foregoing, the invention has the following advantages.

1. The user can control the fan rotation speed regulating device according to the fan rotation speed value shown on the LCD to optimize the rotation speed of the fan used for the microprocessor and then minimize the noise.
2. The location of the heat source to be sensed can be changed.
3. The microprocessor is operated under a safe condition.
4. The invention has both USB port and IEEE1394 port.
5. The buzzer warns the user when the fan rotation speed is lower than a predetermined value or the temperature of the heat source is excessively high.

Those skilled in the art will readily appreciate that the above description is only illustrative of specific, embodiments and examples of the invention. The invention should therefore cover various modifications and variations made to the herein-described structure and operations of the invention, provided they fall within the scope of the invention as defined in the following appended claims.

What is claimed is:

1. An assembly of computer peripherals, which has the functions of temperature control and fan rotation speed regulation, comprising:

a temperature sensing circuit, for sensing a temperature increase due to a heat generated from a host casing, a hard disk and a microprocessor in operation;

a fan driver circuit, for driving a fan to rotate;

a liquid crystal display (LCD) driver circuit, connected to a LCD to respectively indicate the location of a heat source, a sensed temperature value and a fan rotation speed;

a fan rotation regulating device, for regulating the fan rotation speed within a safe range;

a control device, for selectively showing the location of the host casing, the hard disk and the microprocessor on the LCD; and a control circuit, respectively connected to the control device, the fan rotation speed regulating device, the temperature sensing circuit, the fan driver circuit and the LCD driver circuit, wherein the control circuit drives the LCD and the fan, and the fan rotation speed regulating device is controlled according to the fan rotation speed value shown on the LCD in order to keep the fan safely rotating while avoiding an excessively high temperature.

2. The assembly of claim 1, further comprising a universal serial bus (USB) and an IEEE1394 port on the host casing.

3. The assembly of claim 1, wherein the sensing circuit further comprises three sensing elements respectively mounted on the host casing, the hard disk and the microprocessor.

4. The assembly of the claim 1, further comprising an alarm circuit connected to the microprocessor which emits a sound when the temperature of the heat source is excessively high or the fan rotation speed is lower than a predetermined value.

5. An assembly of computer peripherals, which has the functions of temperature control and fan rotation speed regulation, comprising:

a host casing, having a panel on a front surface thereof, wherein the panel is provided with a hollow portion, and a circuit board is mounted inside the host casing;

a temperature sensing circuit, mounted on the circuit board for detecting a temperature increase due to the heat from the host casing, a hard disk and a microprocessor in operation;

a fan driver circuit, mounted on the circuit board for driving a fan in rotation;

a liquid crystal display (LCD) driver circuit, mounted on the host casing and connected to a LCD to respectively indicate the locations of a heat source, a sensed temperature value, and a fan rotation speed;

a fan rotation regulating device, mounted on the host casing for regulating the fan rotation speed within a safe range;

a control device, mounted on the host casing for selectively showing the location of the host casing, the hard disk and the microprocessor on the LCD; and a control circuit, mounted on the circuit board and respectively connected to the control device, the fan rotation speed regulating device, the temperature sensing circuit, the fan driver circuit and the LCD driver circuit, wherein the control circuit drives the LCD, the fan and the alarm circuit, and wherein the fan rotation speed regulating device is controlled according to the fan rotation speed value shown on the LCD in order to keep the fan safely rotating while avoiding an excessively high temperature.

6. The assembly of claim 5, wherein the host casing further comprises a universal serial bus (USB) and an IEEE1394 port thereon.

7. The assembly of claim 5, wherein the sensing circuit further comprises three sensing elements respectively mounted on the host casing, the hard disk and the microprocessor.

8. The assembly of claim 5, wherein the panel is fixed to the host casing through a plurality of engaging elements.

9. The assembly of claim 5, wherein the panel is replaceable.

* * * * *